(12) United States Patent
La

(10) Patent No.: US 9,596,482 B2
(45) Date of Patent: Mar. 14, 2017

(54) VIDEO ENCODING DEVICE USING ADAPTIVE SEARCH RANGE AND METHOD THEREOF

(71) Applicant: SAMSUNG ELECTRONICS CO., LTD., Suwon-Si, Gyeonggi-do (KR)

(72) Inventor: Byeong-Du La, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 186 days.

(21) Appl. No.: 14/524,662

(22) Filed: Oct. 27, 2014

(65) Prior Publication Data

US 2015/0237347 A1    Aug. 20, 2015

(30) Foreign Application Priority Data

Feb. 19, 2014  (KR) .......................... 10-2014-0019286

(51) Int. Cl.
| | | |
|---|---|---|
| *H04N 7/12* | (2006.01) | |
| *H04N 11/02* | (2006.01) | |
| *H04N 11/04* | (2006.01) | |
| *H04N 19/56* | (2014.01) | |
| *H04N 19/31* | (2014.01) | |
| *H04N 19/57* | (2014.01) | |
| *H04N 19/533* | (2014.01) | |

(52) U.S. Cl.
CPC ............. *H04N 19/56* (2014.11); *H04N 19/31* (2014.11); *H04N 19/57* (2014.11); *H04N 19/533* (2014.11)

(58) Field of Classification Search
CPC .... H04N 19/10; H04N 19/103; H04N 19/114; H04N 19/119

USPC .......................... 375/240.02, 240.12, 240.24
See application file for complete search history.

(56) References Cited

U.S. PATENT DOCUMENTS

| | | | |
|---|---|---|---|
| 5,473,379 A | 12/1995 | Horne | |
| 7,551,673 B1 | 6/2009 | Oh et al. | |
| 7,840,085 B2 | 11/2010 | Nagaraj et al. | |
| 8,094,714 B2 | 1/2012 | Nakazato et al. | |
| 2007/0230576 A1 | 10/2007 | Heller et al. | |
| 2010/0014588 A1 | 1/2010 | Nakazato et al. | |
| 2010/0215104 A1 | 8/2010 | Osamoto et al. | |
| 2011/0176613 A1 | 7/2011 | Tsai et al. | |
| 2011/0211640 A1 | 9/2011 | Kim et al. | |
| 2011/0243232 A1 | 10/2011 | Alshina et al. | |

FOREIGN PATENT DOCUMENTS

| | | |
|---|---|---|
| KR | 1020110029608 | 3/2011 |
| KR | 1020130029361 | 3/2013 |
| WO | 2013039357 | 3/2013 |

*Primary Examiner* — Dominic D Saltarelli
(74) *Attorney, Agent, or Firm* — F. Chau & Associates, LLC

(57) ABSTRACT

A device and method for encoding a picture sequence including a group of pictures (GOP) having a base layer and a hierarchical layer. The device includes a first unit and a second unit. The first unit is configured to perform an inter-prediction operation on first unit blocks of a first picture in the base layer with reference to first reference picture in the base layer using a first search range, and to obtain first optimum motion vectors corresponding to the first unit blocks of the first picture. The second unit is configured to determine a second search range using the first optimum motion vectors. The first unit is configured to perform the inter-prediction operation on second unit blocks of a second picture in the hierarchical layer using the second search range.

12 Claims, 15 Drawing Sheets

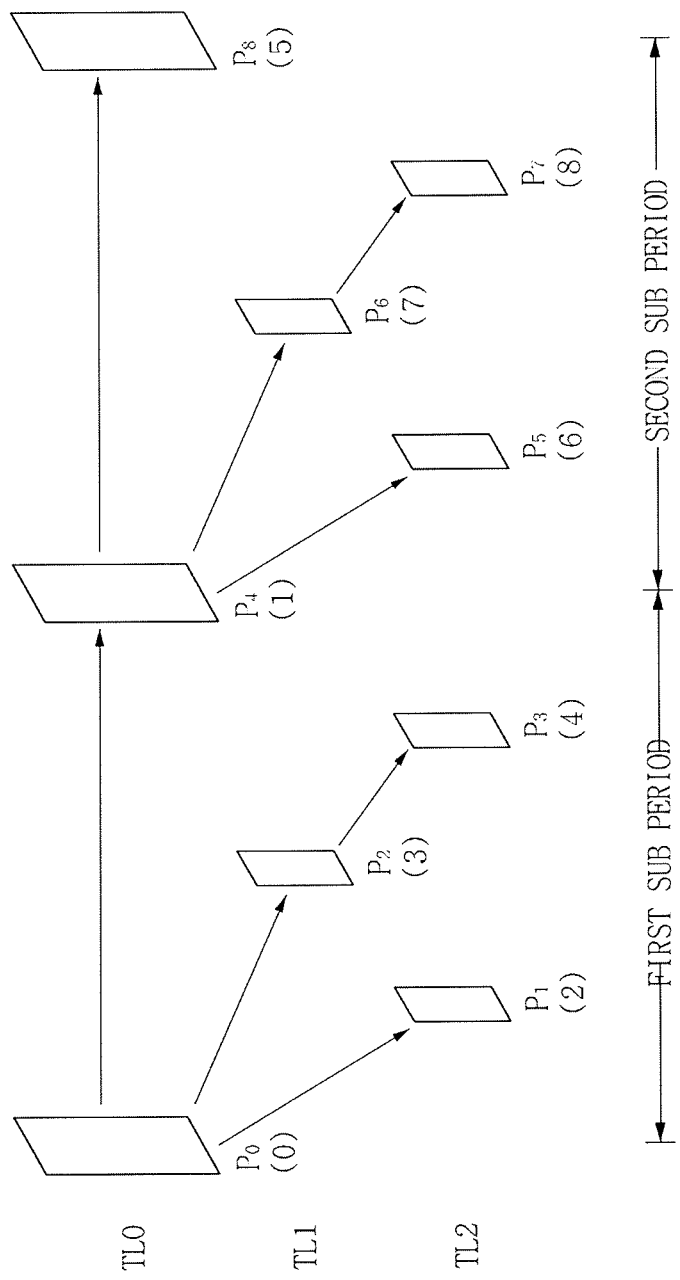

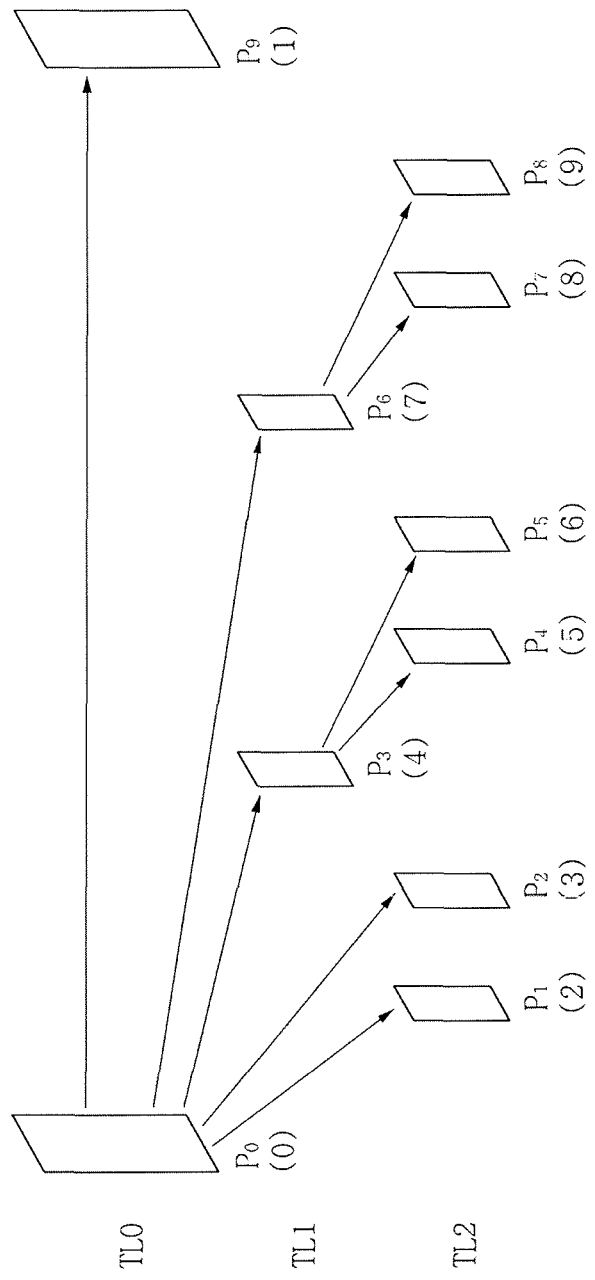

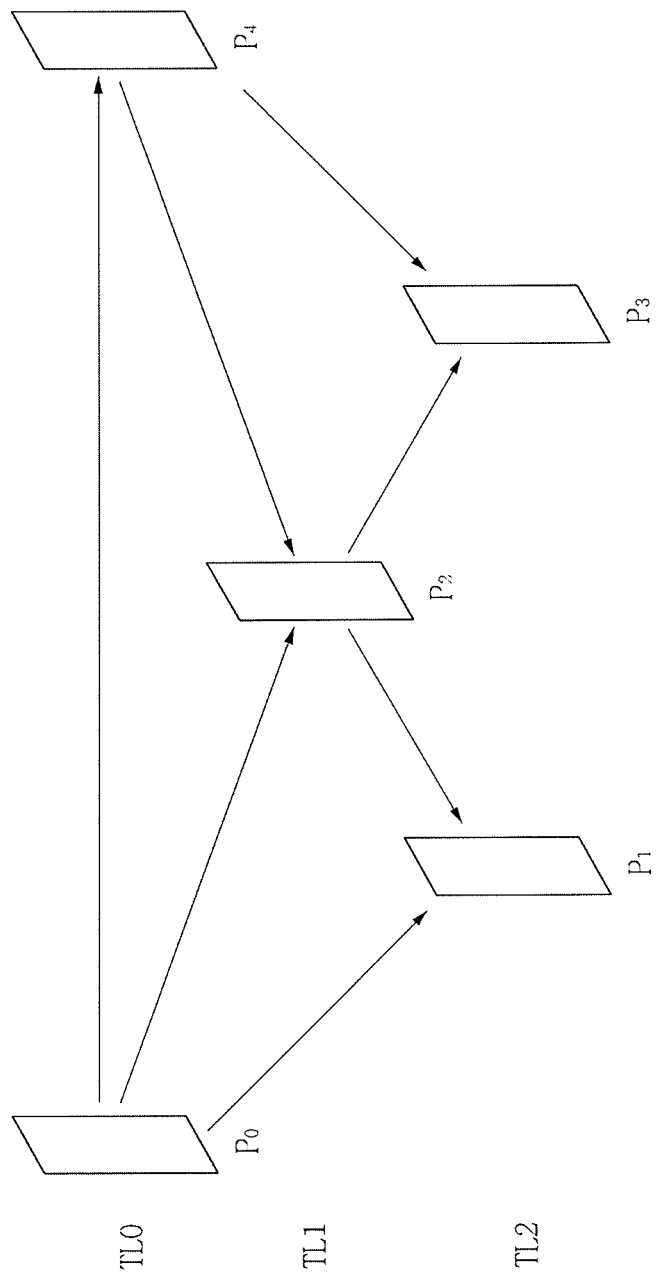

VIDEO ENCODING DEVICE USING ADAPTIVE SEARCH RANGE AND METHOD THEREOF

CROSS-REFERENCE TO RELATED APPLICATION

This application claims priority under 35 U.S.C. §119 to Korean Patent Application No. 10-2014-0019286 filed on Feb. 19, 2014, the disclosure of which is incorporated by reference herein in its entirety.

TECHNICAL FIELD

The present inventive concept relates to a video encoding device, and more particularly, to a video encoding device using an adaptive search range, and a method thereof.

DISCUSSION OF THE RELATE ART

When encoding videos according to, for example, MPEG-4, H.264, etc., an image sequence may be encoded in units of a group of pictures (GOP) having a plurality of pictures. For example, as illustrated in FIG. 11, an image sequence may include a plurality of GOPs, a size of each GOP being 8. The GOP includes a hierarchical picture structure having a plurality of layers (for example, a base layer, and a hierarchical layer such as a first layer, a second layer). For example, as illustrated in FIG. 12, when a size of a GOP is 4, pictures $P_0$ and $P_4$ are included in a base layer TL0, a picture $P_2$ is included in a first layer TL1 which is a hierarchical layer, and pictures $P_1$ and $P_3$ are included in a second layer TL2 which is lower than the first layer.

The picture $P_4$ of the base layer TL0 is encoded with reference to the picture $P_0$ (e.g., a base layer reference picture), the picture $P_2$ of the first layer TL1 is encoded with reference to the pictures $P_0$ and $P_4$, and the pictures $P_1$ and $P_3$ of the second layer TL2 are encoded with reference to the pictures $P_0$ and $P_2$, and pictures $P_2$ and $P_4$, respectively.

An inter-prediction operation may be performed using a fixed search range to obtain an optimum motion vector and an optimum reference picture on a current unit block (for example, a macro-block) for a motion estimation (ME).

When a fixed large search range is used for the inter-prediction operation, a relatively long time may be taken to obtain the optimum motion vector and thus, power consumption in a video encoding device may be increased.

SUMMARY

In accordance with an embodiment of the present inventive concept, a device for encoding a picture sequence including a group of pictures (GOP) having a base layer and a hierarchical layer is provided. The device includes a first unit and a second unit. The first unit is configured to receive first unit blocks generated by dividing a first picture in the base layer, to perform an inter-prediction operation on the first unit blocks with reference to a first reference picture in the base layer using a first search range, and to obtain first optimum motion vectors corresponding to the first unit blocks. The second unit is configured to determine a second search range using the first optimum motion vectors. The first unit is configured to receive second unit blocks generated by dividing a second picture in the hierarchical layer, and to perform an inter-prediction operation on the second unit blocks using the second search range.

As an embodiment of the present inventive concept, the second unit may be configured to determine an accumulated motion vector corresponding to the first picture using the first optimum motion vectors, and to determine the second search range using the determined accumulated motion vector.

As an embodiment of the present inventive concept, the accumulated motion vector may be determined using at least one of a plurality of accumulated motion vector regions including first to third accumulated motion vector regions. The first accumulated motion vector region may be increased by 1 when absolute values of x and y components of each of the first optimum motion vectors are included in a first motion vector region of a plurality of motion vector regions. The plurality of motion vector regions may be obtained by dividing the first search range. The second accumulated motion vector region may be increased by 1 when the absolute values of x or y components of each of the first optimum motion vectors is included in a second motion vector region of the plurality of motion vector regions. The third accumulated motion vector region may be increased by 1 when the absolute values of x or y components of each of the first optimum motion vectors is included in a third motion vector region of the plurality of motion vector regions. Each of the plurality of accumulated motion vector regions may correspond to each of the plurality of motion vector regions.

As an embodiment of the present inventive concept, the device may further include a third unit and a fourth unit. The third unit may be configured to perform an intra-prediction operation on the first unit blocks of the first picture. The fourth unit may be configured to determine one encoding mode between inter- and intra-encoding modes for each of the first unit blocks using the inter-prediction operation and the intra-prediction operation, and to generate an encoding mode counting signal based on numbers of the determined inter- and intra-encoding modes for each of the first unit blocks. The second unit may be configured to determine the second search range using the encoding mode counting signal.

As an embodiment of the present inventive concept, the second unit may be configured to determine an initial set search range as the accumulated motion vector when an intra-encoding mode rate obtained using the encoding mode counting signal is greater than a first threshold value. The intra-encoding mode rate is a ratio of the number of the determined intra-encoding modes to the number of the determined inter-encoding modes.

As an embodiment of the present inventive concept, ±maximum value of the first motion vector region may be determined as the accumulated motion vector when a value of the first accumulated motion vector region is equal to or greater than a second threshold value. ±maximum value of the second motion vector region may be determined as the accumulated motion vector when the value of the first accumulated motion vector region is smaller than the second threshold value, and a value of the second accumulated motion vector region is equal to or greater than the second threshold value. ±maximum value of the third motion vector region may be determined as the accumulated motion vector when the values of the first and second accumulated motion vector regions are smaller than the second threshold value, and a value of the third accumulated motion vector region is equal to or greater than the second threshold value.

As an embodiment of the present inventive concept, the second unit may be configured to determine the determined accumulated motion vector as the second search range when the determined accumulated motion vector is greater than a minimum search range. The second unit may be configured to determine the minimum search range as the second search range when the determined accumulated motion vector is equal to or smaller than the minimum search range.

As an embodiment of the present inventive concept, the second picture may be a picture between the first reference picture and the first picture referring to the first reference picture.

In accordance with an embodiment of the present inventive concept, a method for encoding a picture sequence including a group of pictures (GOP) having a base layer and a hierarchical layer is provided. The method includes obtaining an accumulated motion vector when encoding first unit blocks of a first picture in the base layer with reference to a first reference picture in the base layer using a first search range, and encoding a second picture in the hierarchical layer using a second search range determined using the obtained accumulated motion vector.

As an embodiment of the present inventive concept, the obtaining of the accumulated motion vector may include performing an intra-prediction operation and an inter-prediction operation on the first unit blocks using the first search range, obtaining first optimum motion vectors using the inter-prediction operation performed on the first unit blocks, obtaining a plurality of accumulated motion vector regions using the first optimum motion vectors, performing an encoding operation on the first unit blocks according to results of the intra-prediction operation and the inter-prediction operation, and determining the accumulated motion vector using the plurality of accumulated motion vector regions. The plurality of accumulated motion vector regions includes first to third accumulated motion vector regions.

As an embodiment of the present inventive concept, the obtaining of the plurality of accumulated motion vector regions may further include increasing a value of the first accumulated motion vector region by 1 when absolute values of x and y components of each of the first optimum motion vectors are included in a first motion vector regions of a plurality of motion vector regions. The plurality of motion vector regions may be obtained by dividing the first search range. The obtaining of the plurality of accumulated motion vector regions may further include increasing a value of the second accumulated motion vector region by 1 when the absolute values of x or y components of each of the first optimum motion vectors is included in a second motion vector region of the plurality of motion vectors regions, and increasing a value of the third accumulated motion vector region by 1 when the absolute values of x or y components of each of the first optimum motion vectors is included in a third motion vector region of the plurality of motion vectors regions.

As an embodiment of the present inventive concept, the performing of the encoding operation on the first unit blocks may include determining one encoding mode between inter- and intra-encoding modes using the inter- and intra-prediction operations for each of the first unit blocks, and accumulating a number of the inter-encoding modes or a number of the intra-encoding modes depending on the determined encoding mode for each of the first unit blocks.

As an embodiment of the present inventive concept, the determining of the accumulated motion vector may include determining an initial set search range as the accumulated motion vector when an intra-encoding mode rate of the first picture is greater than a first threshold value. The intra-encoding mode rate may be a ratio of the number of the determined intra-encoding modes to the number of the determined inter-encoding modes.

As an embodiment of the present inventive concept, the determining of the accumulated motion vector may comprise determining ±maximum value of the first motion vector region as the accumulated motion vector when a value of the first accumulated motion vector region is equal to or greater than a second threshold value, determining ±maximum value of the second motion vector region as the accumulated motion vector when the value of the first accumulated motion vector region is smaller than the first threshold value, and a value of the second accumulated motion vector region is equal to or greater than the second threshold value, and determining ±maximum value of the third motion vector region as the accumulated motion vector when the values of the first and second accumulated motion vector regions are smaller than the second threshold value, and a value of the third accumulated motion vector region is equal to or greater than the second threshold value.

As an embodiment of the present inventive concept, the determined accumulated motion vector may be determined as the second search range when the determined accumulated motion vector is greater than a minimum search range. The minimum search range may be determined as the second search range when the determined accumulated motion vector is equal to or smaller than the minimum search range.

In accordance with an embodiment of the present inventive concept, a device for encoding a picture sequence including a group of pictures (GOP) having a base layer and a hierarchical layer is provided. The device includes an inter-prediction unit, an intra-prediction unit, and a search range determining unit. The inter-prediction unit is configured to receive first unit blocks generated by dividing a first picture in the base layer, to perform an inter-prediction operation on the first unit blocks with reference to a first reference picture in the base layer using a first search range, and to obtain first optimum motion vectors corresponding to the first unit blocks. The intra-prediction unit is configured to perform an intra-prediction operation on the first unit blocks. The search range determining unit is configured to receive the first optimum motion vectors from the inter-prediction unit, to obtain an accumulated motion vector using the first optimum motion vectors, to determine the second search range using the obtained accumulated motion vector, and to output the determined second search range to the inter-prediction unit. The second search range is used to perform an inter-prediction operation on second unit blocks generated by dividing a second picture in the hierarchical layer.

As an embodiment of the present inventive concept, the device may further include a unit block generating unit configured to generate the first unit blocks and the second unit blocks.

As an embodiment of the present inventive concept, the device may further include a unit block encoding unit configured to encode each of the first unit blocks according to an encoding mode determined using the inter- and intra-prediction operations.

As an embodiment of the present inventive concept, the second picture may be a picture between the first reference picture and the first picture referring to the first reference picture.

As an embodiment of the present inventive concept, the obtained accumulated motion vector may be determined as the second search range when the obtained accumulated motion vector is greater than a minimum search range. The minimum search range may be determined as the second search range when the obtained accumulated motion vector is equal to or smaller than the minimum search range.

BRIEF DESCRIPTION OF THE DRAWINGS

The foregoing and other features of the present inventive concept will become apparent by describing in detailed exemplary embodiments thereof with reference to the accompanying drawings of which:

FIG. 7B is a diagram illustrating a hierarchical picture structure of a GOP according to an embodiment of the present inventive concept;

FIG. 7D is a diagram illustrating a hierarchical picture structure of a GOP according to an embodiment of the present inventive concept;

FIG. 12 is a diagram illustrating a hierarchical picture structure of a GOP.

DETAILED DESCRIPTION OF THE EMBODIMENTS

Exemplary embodiments of the present inventive concept will be described in detail with reference to the accompanying drawings. It will be understood that the present inventive concept, however, may be embodied in various forms, and should not be construed as being limited to the embodiments set forth herein.

As used herein, singular forms such as "a," "an," and "the", are intended to include plural forms as well, unless the context clearly indicates otherwise. Hereinafter, exemplary embodiments of the present inventive concept will be described below with reference to accompanying drawings.

Figure 1:
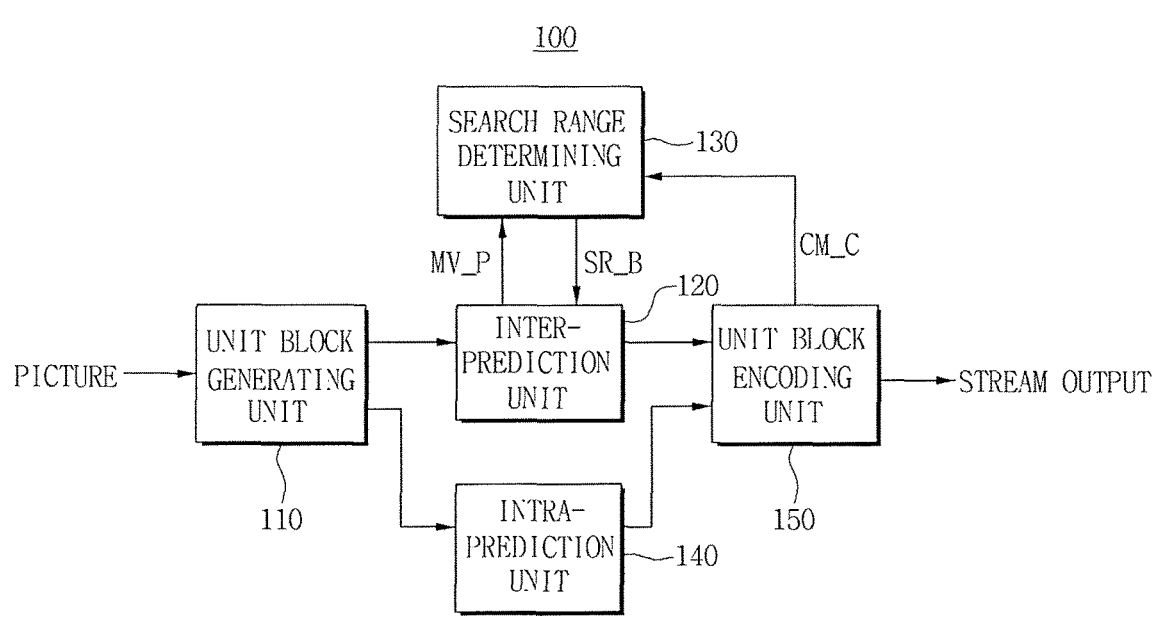
FIG. 1 is a block diagram illustrating a video encoding device according to an embodiment of the present inventive concept.

FIG. 1 is a block diagram illustrating a video encoding device according to an embodiment of the present inventive concept.

Referring to FIG. 1, a video encoding device 100 includes a unit block generating unit 110, an inter-prediction unit 120, a search range determining unit 130, an intra-prediction unit 140, and a unit block encoding unit 150.

The unit block generating unit 110 may receive a picture sequence including a plurality of pictures constituting a group of picture (GOP) from the outside, and generate a plurality of unit blocks by dividing each of the received pictures. Here, each unit block may be a macro-block in MPEG 4 or H.264, or may be a block compliant to other standards. For example, in the other standards, the unit block may be a block corresponding to the macro-block in the MPEG 4 or the H.264.

Each picture may be among I, P, B pictures. Here, the picture may be a frame picture, or a slice picture.

The generated unit blocks may be output to the inter-prediction unit 120 and the intra-prediction unit 140.

The inter-prediction unit 120 may receive the output unit blocks, perform an inter-prediction operation on the received unit blocks using a first search range or a second search range SR_B depending on a picture from which the received unit blocks are generated. The first search range may be a set value. The second search range SR_B may be received from the search range determining unit 130 for performing the ME. For example, the inter-prediction unit 120 may perform the inter-prediction operation on first unit blocks of a first picture in a base layer using the set first search range. In addition, the inter-prediction unit 120 may perform an inter-prediction operation on second unit blocks of a second picture in the hierarchical layer using the second search range SR_B received from the search range determining unit 130.

In addition, the inter-prediction unit 120 may obtain first optimum motion vectors MV_P for each of the first unit blocks of the first picture of the base layer, and output the obtained first optimum motion vectors MV_P to the search range determining unit 130.

The search range determining unit 130 may receive the first optimum motion vectors from the inter-prediction unit 120, obtain an accumulated motion vector using the first optimum motion vectors MV_P, determine the second search range SR_B using the obtained accumulated motion vector, and output the determined second search range SR_B to the inter-prediction unit 120. Further, the search range determining unit 130 may determine the second search range SR_B using an encoding mode counting signal CM_C received from the unit block encoding unit 150.

The intra-prediction unit 140 may perform an intra-prediction operation on the received first unit blocks of the first picture in the base layer.

The unit block encoding unit 150 may determine an encoding mode, between inter- and intra-encoding modes, for each of the received first unit blocks of the first picture based on results of the inter-prediction operation and the intra-prediction operation performed by the inter-prediction unit 120 and the intra-prediction unit 140, respectively, encode the first unit blocks of the first picture in an inter-encoding mode or an intra-encoding mode, and output an encoded bit stream.

Further, the unit block encoding unit 150 may output the encoding mode counting signal CM_C to the search range determining unit 130. The encoding mode counting signal CM_C may include a value corresponding to the accumulated number of the inter-encoding modes and the accumulated number of intra-encoding modes.

Each of the functional blocks included in the video encoding device shown in FIG. 1 may be implemented by hardware, or software.

Figure 2A:
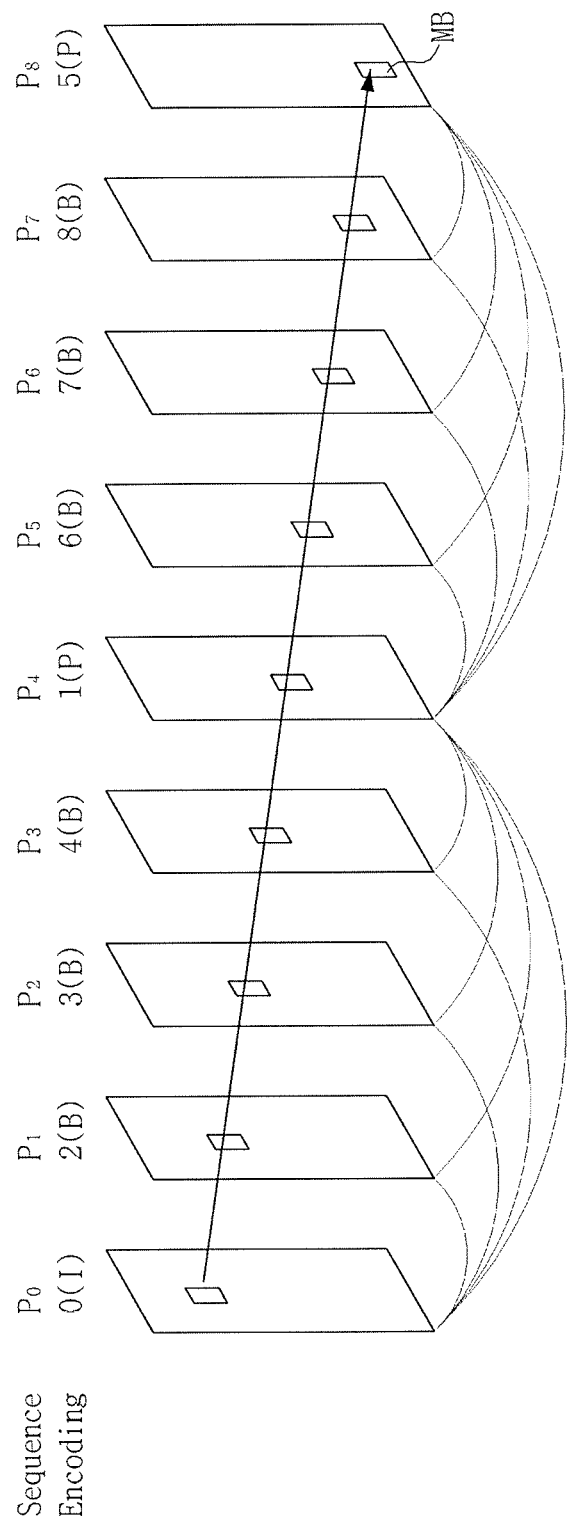
FIG. 2A is a diagram illustrating a picture sequence of a group of pictures (GOP) encoded according to an embodiment of the present inventive concept.

FIG. 2A is a diagram illustrating a picture sequence of a GOP which is encoded according to an embodiment of the present inventive concept.

Referring to FIG. 2A, a picture sequence includes pictures $P_0$ to $P_8$ which are sequentially arranged, and the pictures $P_0$ to $P_8$ have picture types of I, B, B, B, P, B, B, B, and P, respectively.

For example, when the pictures $P_0$ to $P_8$ are encoded, an intra-encoding operation is performed on the picture $P_0$ having an I picture type, an intra-encoding mode is performed on the picture $P_4$ having a P picture type, and an inter-encoding is performed on the picture $P_4$ with reference to the picture $P_0$. In addition, an intra-encoding is performed on the picture $P_1$ having a B picture type and an inter-encoding is performed on the picture $P_1$ with reference to the pictures $P_0$ and $P_4$. In addition, an intra-encoding is performed on the picture $P_2$ having a B picture type and an inter-encoding is performed on the picture $P_2$ with reference to the pictures $P_0$ and $P_4$. In addition, an intra-encoding is performed on the picture $P_3$ having the B picture type and an inter-encoding is performed on the picture $P_3$ with reference to the pictures $P_0$ and $P_4$. A period for encoding the pictures $P_0$ to $P_4$ may be referred to as a "first sub period".

In addition, the encoding operations are performed on the pictures $P_5$ to $P_8$. For example, an intra-encoding is performed on the picture $P_8$ having the P picture type and an inter-encoding is performed on the picture $P_8$ with reference to the picture $P_4$. In addition, an intra-encoding is performed on the picture $P_5$ having the B picture type and an inter-encoding is performed on the picture $P_5$ with reference to the pictures $P_4$ and $P_8$. In addition, an intra-encoding is performed on the picture $P_6$ having the B picture type and an inter-encoding is performed on the picture $P_6$ with reference to the pictures $P_4$ and $P_8$. In addition, an intra-encoding is performed on the picture $P_7$ having the B picture type and an inter-encoding is performed on the picture $P_7$ with reference to the pictures $P_4$ and $P_8$. A period for encoding the pictures $P_4$ to $P_8$ may be referred to as a "second sub period".

Hereinafter, the pictures having picture types I, B, and P may be referred to as "I picture, B picture, and P picture, respectively.

Referring to FIG. 2A, an arrow passing through the picture sequence indicates a motion of a specific unit block (for example, the macro-block) illustrated as small rectangles in the pictures $P_0$ to $P_8$.

Figure 2B:
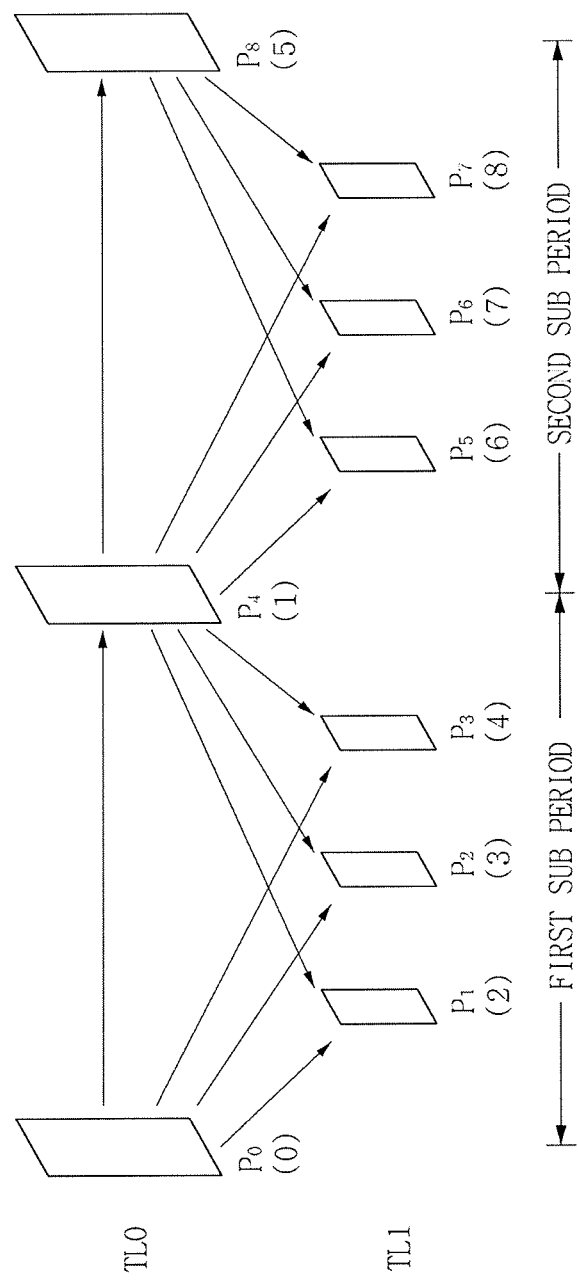
FIG. 2B is a diagram illustrating a hierarchical picture structure of the GOP shown in FIG. 2A according to an embodiment of the present inventive concept.

FIG. 2B is a diagram illustrating a hierarchical picture structure of the GOP shown in FIG. 2A according to an embodiment of the present inventive concept.

Referring to FIG. 2B, a GOP includes a base layer TL0 and a first layer TL1 that is a hierarchical layer.

The pictures $P_0$, $P_4$, and $P_8$ are included in the base layer TL0, and the pictures $P_1$, $P_2$, and $P_3$ in the first sub period and the pictures $P_5$, $P_6$, and $P_7$ in the second sub period are included in the first layer TL1.

The picture $P_0$ may be a base layer reference picture with respect to the picture $P_4$, and the picture $P_4$ may be a base layer reference picture with respect to the picture $P_8$.

Numerals in parentheses indicate the encoding sequence.

Figure 3:
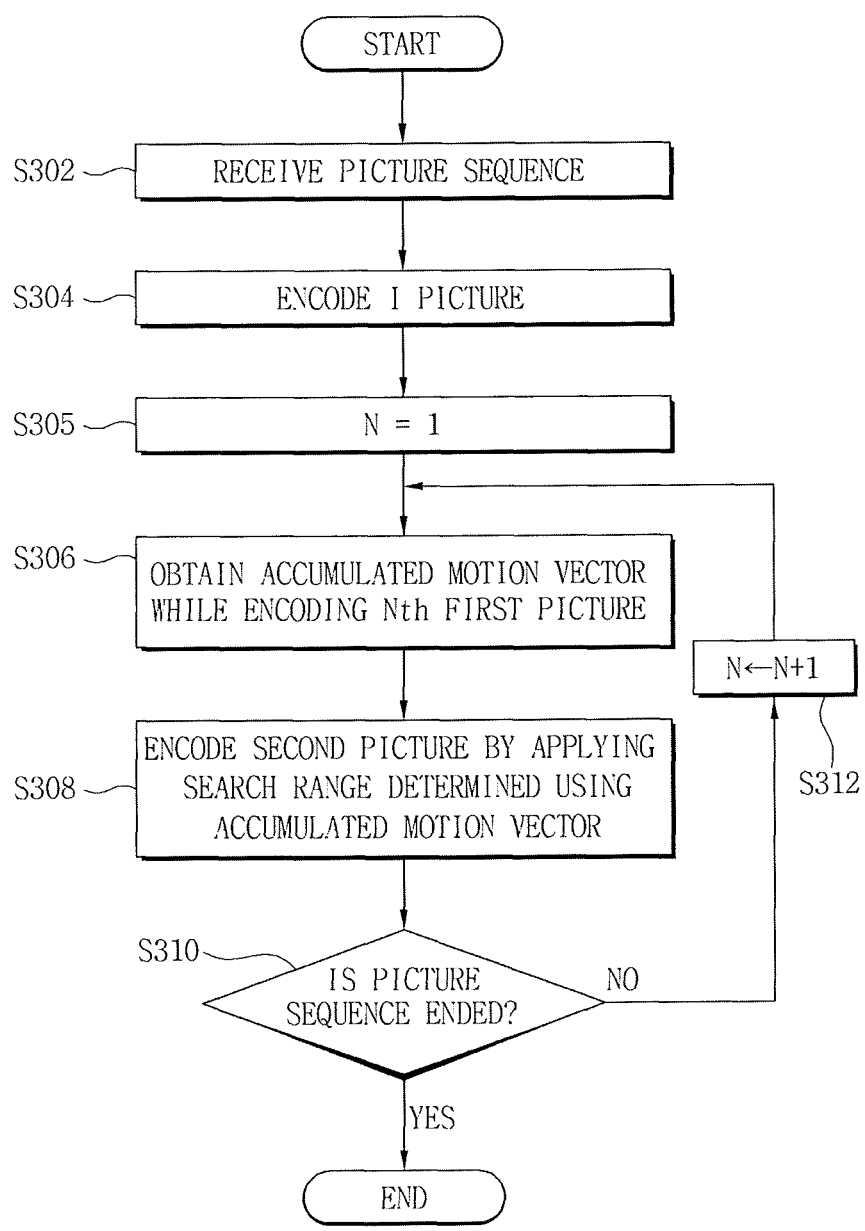
FIG. 3 is a flowchart illustrating a method of encoding a picture sequence of a GOP according to an embodiment of the present inventive concept.

FIG. 3 is a flowchart illustrating a method of encoding a picture sequence of a GOP according to an embodiment of the present inventive concept.

Referring to FIG. 3, a picture sequence including a plurality of pictures constituting a GOP for encoding is received (S302).

A method of encoding the picture sequence having a GOP includes encoding pictures having the I picture type among the plurality of pictures in the picture sequence. The method includes performing an intra-encoding operation after performing an intra-prediction operation on each unit block of the I pictures (S304).

The method further includes obtaining an accumulated motion vector corresponding to a first picture of the base layer TL0 when encoding the first picture among the picture sequence (S305 and S306). Here, the first picture (e.g., the picture $P_4$) is a picture, included in the base layer, for performing an inter-prediction operation with reference to a base layer reference picture (e.g., the picture $P_0$). In FIGS. 2A and 2B, the picture $P_4$ corresponds to the first picture of when N=1 among the first pictures.

Figure 4:
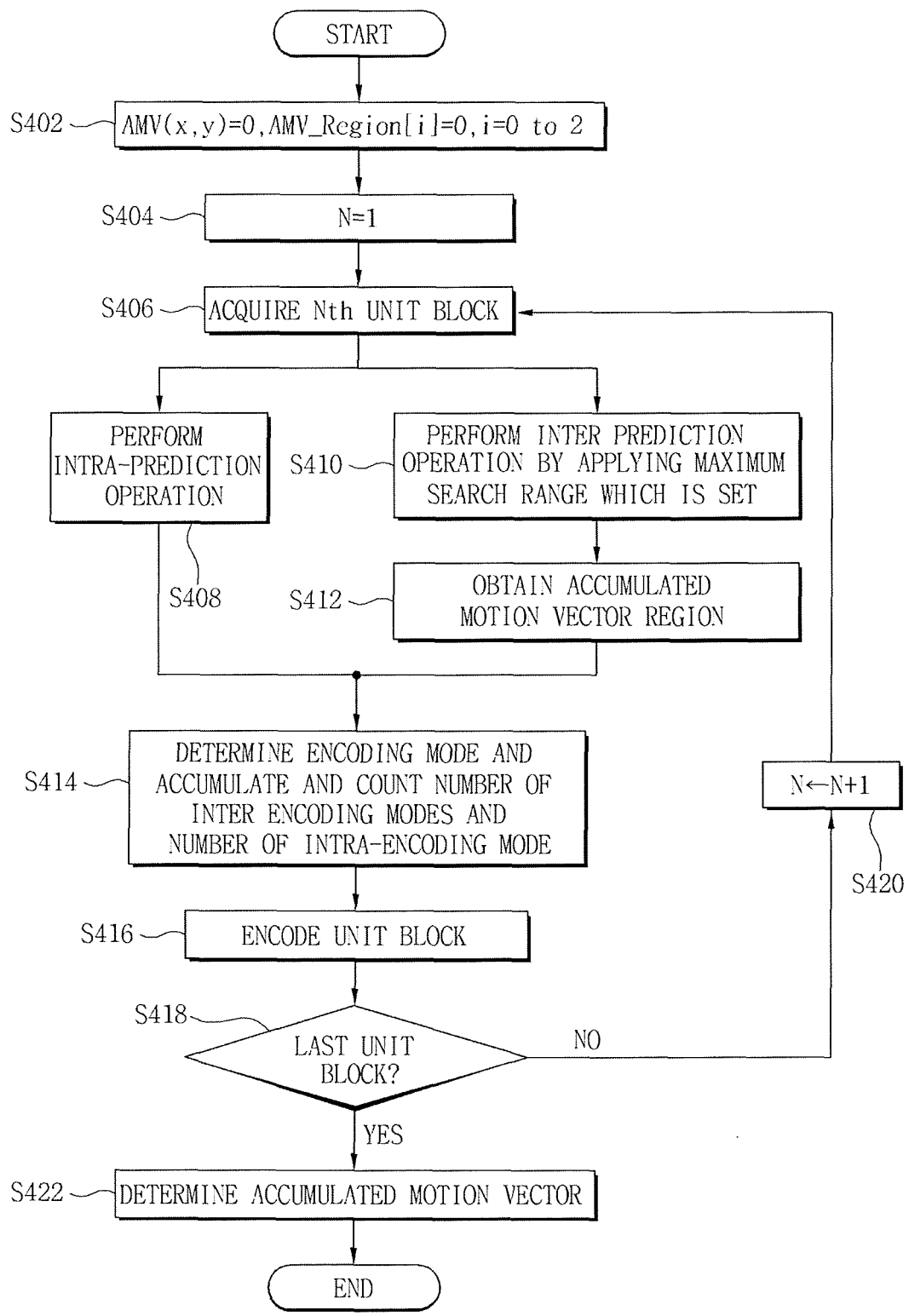
FIG. 4 is a flowchart illustrating a method of obtaining an accumulated motion vector when encoding a first picture of a base layer according to an embodiment of the present inventive concept.

FIG. 4 is a flowchart illustrating a method of obtaining an accumulated motion vector when encoding a first picture of a base layer according to an embodiment of the present inventive concept.

In an embodiment of the present inventive concept, when a maximum search range (e.g., the first search range) of a video encoding device is set to 128, a plurality of motion vector regions may be set by dividing the maximum search range into a plurality of search ranges. For example, each of the divided search ranges may correspond to each of the plurality of motion vector regions, respectively.

For example, a first motion vector region MV_Region[0] of the plurality of motion vector regions may have a search range of 0 to 42, a second motion vector region MV_Region[1] of the plurality of motion vector regions may have a search range of 43 to 85, and a third motion vector region MV_Region[2] of the plurality of motion vector regions may have a search region of 86 to 128.

The number of motion vector regions may be variously configured according to an embodiment of the present inventive concept.

Referring to FIG. 4, first, the method of obtaining an accumulated motion vector includes initializing the accumulated motion vector AMV(x, y) as 0, and accumulated motion vector regions AMV_Region [i] (e.g., i=0 to 2) as 0 (S402).

The method further includes acquiring a particular unit block among the first unit blocks of the first picture (S404, and S406).

The method further includes performing an intra-prediction operation on the acquired particular unit block of the first picture (S408).

The method includes performing an inter-prediction operation on the acquired particular unit block of the first picture using a maximum search range which is a set value (S410). In FIGS. 2A and 2B, the method may perform an inter-prediction operation on a unit block of the picture $P_4$ with reference to the picture $P_0$, or on a unit block of the picture $P_8$ with reference to the picture $P_4$.

The method includes obtaining an accumulated motion vector region AMV_Region using the first optimum motion vectors obtained by performing the inter-prediction operation (S412).

The accumulated motion vector region AMV_Region may be obtained as follows.

When an absolute value ABS(Best MV(x)) of a x component of each of the first optimum motion vectors and an absolute value ABS(Best MV(y)) of a y component of each of the first optimum motion vectors are included in a search range of a first motion vector region MV_Region[0], the method may increase a first accumulated motion vector region AMV_Region[0] by +1.

When an absolute value ABS(Best MV(x)) of a x component of each of the of each of the first optimum motion vectors or an absolute value ABS(Best MV(y)) of a y component of each of the first optimum motion vectors are included in a search range of a second motion vector region MV_Region[1], the method may increase a second accumulated motion vector region AMV_Region[1] by +1.

When an absolute value ABS(Best MV(x)) of a x component of each of the first optimum motion vectors or an absolute value ABS(Best MV(y)) of a y component of each of the first optimum motion vectors are included in a search range of a third motion vector region MV_Region[2], the method may increase a third accumulated motion vector region AMV_Region[2] by +1.

In an exemplary embodiment of the present inventive concept, when an absolute value ABS(Best MV(x)) of a x component of each of the first optimum motion vectors and an absolute value ABS(Best MV(y)) of a y component of each of the first optimum motion vectors is included in a search range of a first motion vector region MV_Region[0], the method may increase a first accumulated motion vector region AMV_Region[0] by +1. In addition, when an absolute value ABS(Best MV(x)) of a x component of each of the of each of the first optimum motion vectors and an absolute value ABS(Best MV(y)) of a y component of each of the first optimum motion vectors is included in a search range of a second motion vector region MV_Region[1], the method may increase a second accumulated motion vector region AMV_Region[1] by +1. In addition, when an absolute value ABS(Best MV(x)) of a x component of each of the first optimum motion vectors and an absolute value ABS(Best MV(y)) of a y component of each of the first optimum motion vectors is included in a search range of a third motion vector region MV_Region[2], the method may increase a third accumulated motion vector region AMV_Region[2] by +1.

The method further includes determining an encoding mode to be applied to each of the first unit blocks of the first picture using results of the intra-prediction operation and the inter-prediction operation, and counting the number of the inter-encoding modes and the number of the intra-encoding modes according to the determined encoding mode (S414).

The method further includes performing an encoding operation on a particular unit block of the first unit blocks of first picture according to the determined encoding mode (S416).

The method further includes performing steps S406 to S416 on the remaining unit blocks of the first picture (S418 and S420). Here, steps S406 to S416 are referred to as a "unit block encoding process".

When the unit block encoding process is completed for all of the first unit blocks of the first picture, the method includes determining the accumulated motion vector AMV (S422).

Figure 5:
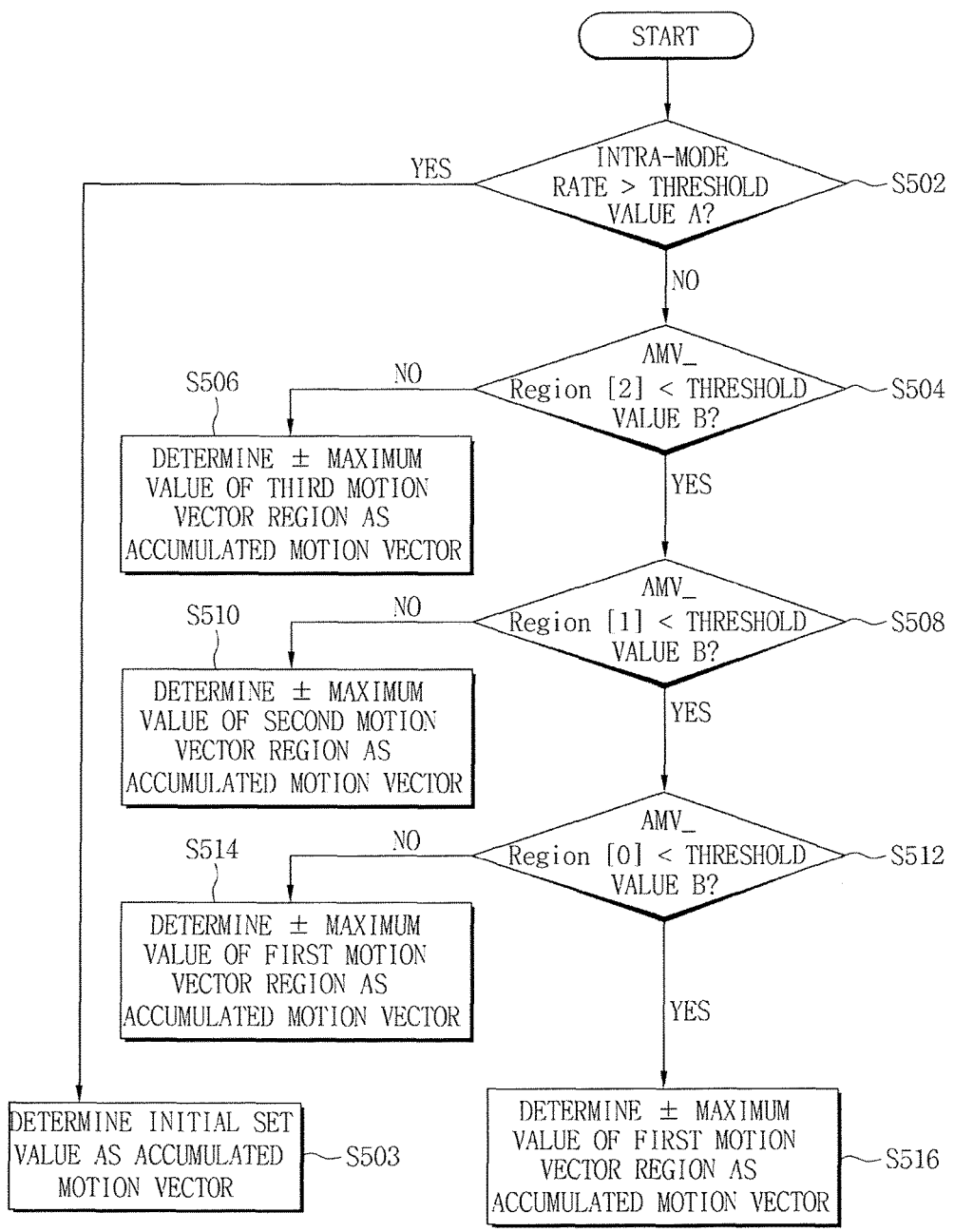
FIG. 5 is a flowchart illustrating a method of determining an accumulated motion vector according to an embodiment of the present inventive concept.

FIG. 5 is a flowchart illustrating a method of determining an accumulated motion vector according to an embodiment of the present inventive concept.

A method of determining an accumulated motion vector includes determining an initial set search range as the accumulated motion vector when an intra-encoding mode rate is greater than a threshold value A. For example, the intra-encoding mode rate may be a ratio of the number of the accumulated intra-encoding modes to the number of the accumulated inter-encoding modes with respect to the first picture. Thus, the determining of the initial set search range as the accumulated motion vector may be performed using the number of the accumulated inter-encoding modes and the number of the accumulated intra-encoding modes (S502 and S503).

The method includes determining a ±maximum value of the third motion vector region MV_Region[2] as the accumulated motion vector AMV(x, y) when the intra-encoding mode rate is equal to or smaller than the threshold value A and the third accumulated motion vector region AMV_Region[2] is equal to or greater than a threshold value B (S504 and S506).

The method includes determining a ±maximum value of the second motion vector region MV_Region[1] as the accumulated motion vector AMV(x, y) when the third accumulated motion vector region AMV_Region[2] is smaller than the threshold value B and the second accumulated motion vector region AMV_Region[1] is equal to or greater than the threshold value B (S508 and S510).

The method includes determining a ±maximum value of the first motion vector region MV_Region[0] as the accumulated motion vector AMV(x, y) when the second accumulated motion vector region AMV_Region[1] is smaller than the threshold value B and the first accumulated motion vector region AMV_Region[0] is equal to or greater than the threshold value B (S512 and S514).

The method includes determining a ±maximum value of the first motion vector region MV_Region[0] as the accumulated motion vector AMV(x, y) when the first accumulated motion vector region AMV_Region[0] is smaller than the threshold value B (S516).

Referring back to FIG. 3, the method further includes encoding a second picture using the determined second search range. The second search range may be determined using the accumulated motion vector obtained in step S306 (S308). For example, the second picture is a picture, included in the hierarchical layer, for performing the inter-prediction operation with reference to a specific picture.

Figure 6A:
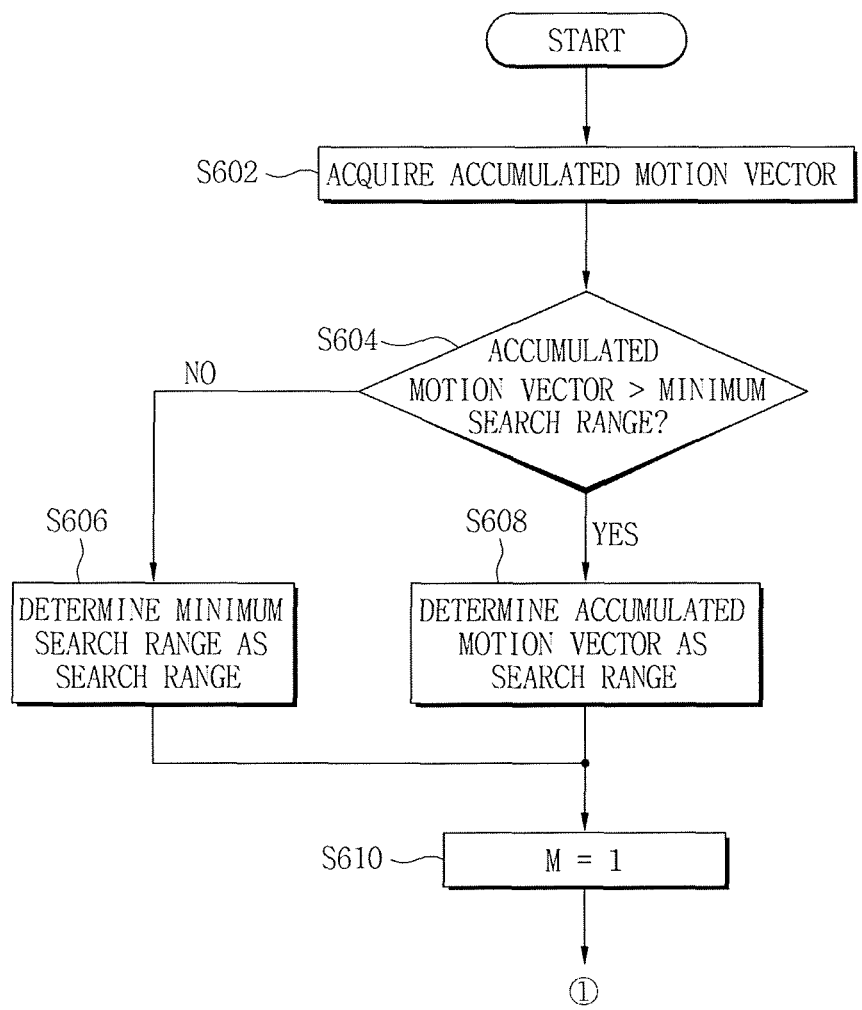
FIGS. 6A and 6B are flowcharts illustrating a method of encoding a second picture of an hierarchical layer according to an embodiment of the present inventive concept.
Figure 6B:
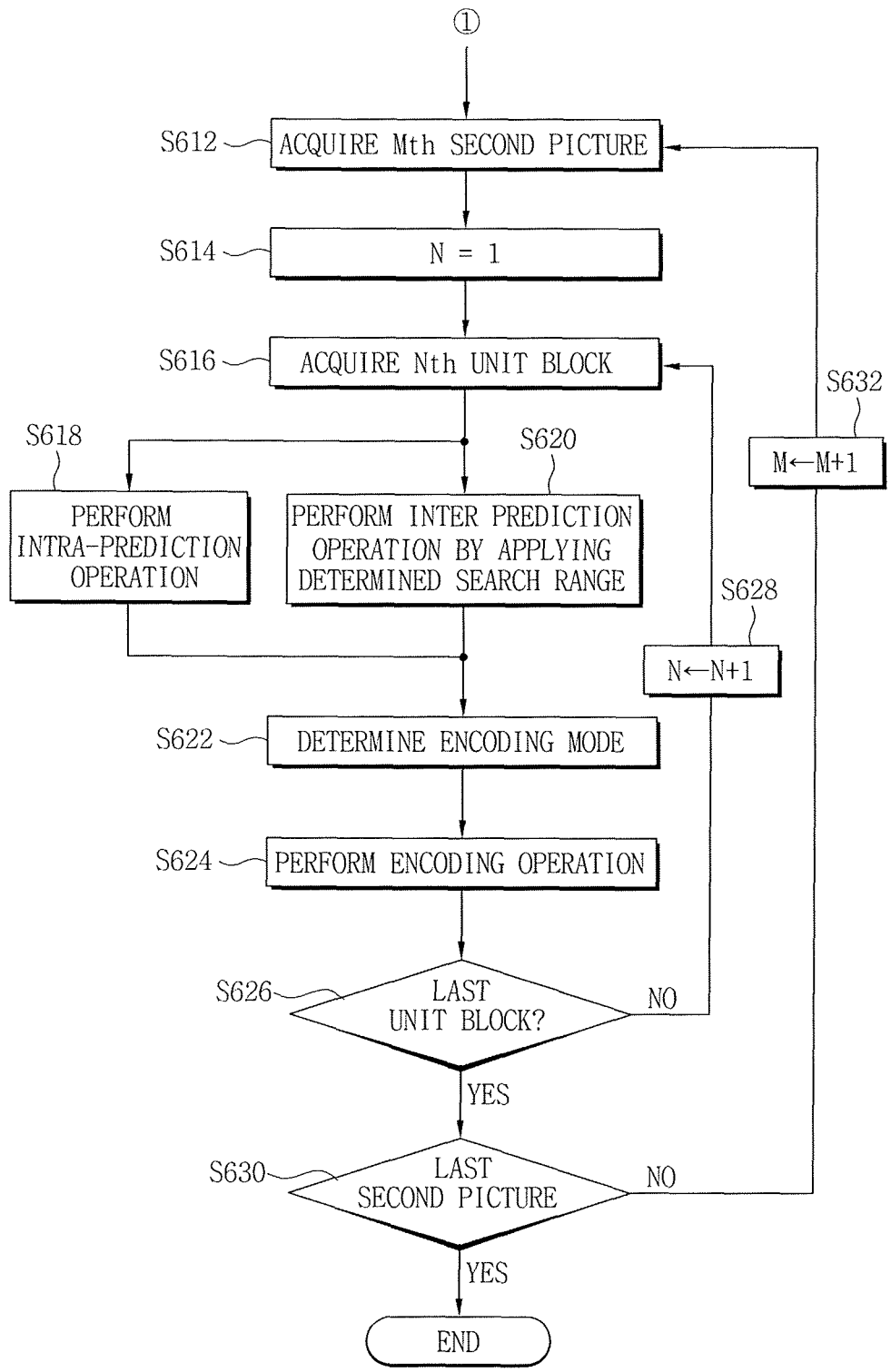

FIGS. 6A and 6B are flowcharts illustrating a method of encoding a second picture of a hierarchical layer according to an embodiment of the present inventive concept.

A method of encoding a second picture of a hierarchical layer includes acquiring the accumulated motion vector obtained in step S306 (S602).

The method includes determining a minimum search range, which is set, as the second search range (SR_B of FIG. 1) when the accumulated motion vector AMV(x, y) is equal to or smaller than the set minimum search range (S604 and S606).

The method includes determining the accumulated motion vector AMV(x, y) as the second search range (e.g., SR_B of FIG. 1) when the accumulated motion vector AMV(x, y) is greater than the set minimum search range (S604 and S608).

The method includes acquiring second pictures (e.g., the pictures $P_1$, $P_2$, and $P_3$ in FIG. 2B), positioned between a corresponding first picture (e.g., the picture $P_4$ in FIG. 2B) and a base layer reference picture (e.g., the picture $P_0$ in FIG. 2B) in S610 and S612. The acquiring of the second pictures may be performed in a sequential manner from a picture (e.g., the picture $P_0$) having the earliest encoding sequence to a picture (e.g., the picture $P_3$ in FIG. 2B) having the latest encoding sequence. Here, the corresponding first picture may be a picture whose accumulated motion vector is obtained, and the base layer reference picture may be a picture to which the corresponding first picture refers. For example, in FIG. 2B, the picture $P_1$ between the pictures $P_0$ and $P_4$ (e.g., the first sub period) may be encoded. For example, in FIGS. 6A and 6B, the method may include acquiring Mth (e.g., M=1 to 3) second pictures (e.g., the pictures $P_1$, $P_2$, and $P_3$ in FIG. 2B) in step S612.

The method includes acquiring a particular unit block among the second unit blocks of the Mth second picture (S614 and S616) and repeating steps S618 to S628 on the Mth second picture.

Hereinafter, the steps S618 to S624 will be described in more detail. The method includes performing an intra-prediction operation on the acquired particular unit block of the Mth second picture (S618).

The method includes performing an inter-prediction operation on the acquired particular unit block of the Mth second picture by applying the determined second search range (S620).

The method includes determining an encoding mode for the particular unit block of the Mth second picture using the results of performing the intra-prediction operation and the inter-prediction operation (S622).

The method includes performing an inter-encoding or intra-encoding operation on the particular unit block of the Mth second picture according the determined encoding mode (S624).

The method includes performing the unit block encoding process steps (S616 to S624) on the remaining unit blocks of the M-th second picture (S626 and S628).

Referring to FIG. 2B, for example, the steps S614 to S628 are repeatedly performed on the pictures $P_2$ and $P_3$ between the pictures $P_0$ and $P_4$ (e.g., the first sub period).

Referring back to FIG. 3, the method includes performing steps S306 and S308 until the encoding operation on every picture of the picture sequence is completed (S310 and S312). For example, in FIG. 2B, the encoding operation is completed on pictures in the first sub period, and the encoding operation is completed on pictures in the second sub period. For example, in FIG. 2B, the pictures $P_4$, $P_1$, $P_2$, and $P_3$ in the first sub period are encoded, and, the pictures $P_8$, $P_5$, $P_6$ and $P_7$ in the second sub period are encoded.

In an embodiment of the present inventive concept, the method may apply a 1st second search range obtained in the first sub period to perform the inter-prediction operation on the hierarchical layer pictures (e.g., the pictures $P_1$, $P_2$, and $P_3$) of the first sub period, and apply a 2nd second search range obtained in the second sub period to perform the inter-prediction operation on the hierarchical layer pictures (e.g., the pictures $P_5$, $P_6$, and $P_7$) of the second sub period. However, the present inventive concept is not limited thereto.

According to an embodiment of the present inventive concept, the method may apply the 1st second search range obtained in the first sub period to perform the inter-prediction operation on the hierarchical layer pictures (e.g., the pictures $P_1$ to $P_7$) in both of the first and second sub periods.

Figure 7A:
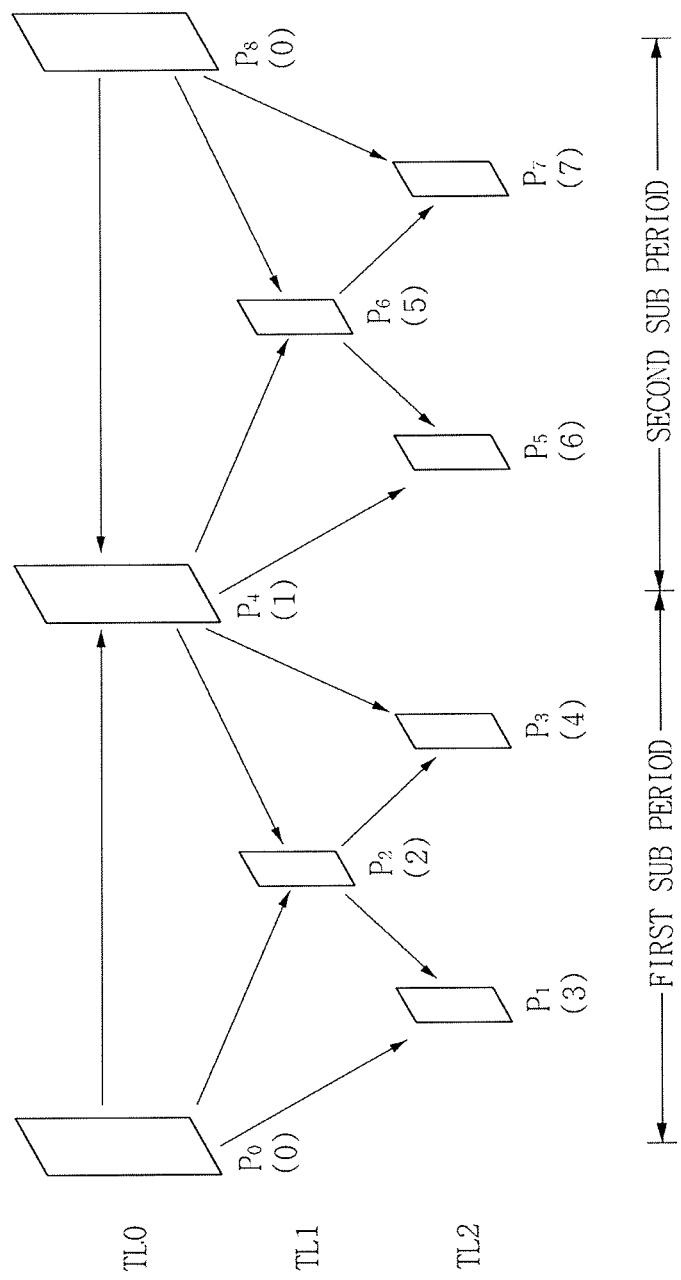
FIG. 7A is a diagram illustrating a GOP structure according to an embodiment of the present inventive concept.

FIG. 7A is a diagram illustrating a GOP structure according to an embodiment of the present inventive concept.

Referring to FIG. 7A, a GOP includes a base layer TL0, a first layer TL1, and a second layer TL2. Here, the first and second layers TL1 and TL2 are hierarchical layers.

Pictures $P_0$ and $P_8$ having the I picture type and picture $P_4$ having the B picture type are included in the base layer TL0, and pictures $P_2$ and $P_6$ having the B pictures type are included in the first layer TL1 of the hierarchical layer, and pictures $P_1$, $P_3$, $P_5$, and $P_7$ having the B picture type are included in the second layer TL2 of the hierarchical layer.

Numerals in parentheses indicate the encoding sequence.

A 1st second search range obtained in a first sub period, for example, a second search range obtained when encoding the picture P4 with reference to the picture P0, may be applied to perform an inter-prediction operation on the pictures $P_1$, $P_2$ and $P_3$ of the hierarchical layer in the first sub period. In addition, a 2nd second search range obtained in a second sub period, for example, a second search range obtained when encoding the picture $P_4$ with reference to the picture $P_8$, may be applied to perform an inter-prediction operation on the pictures $P_5$, $P_6$ and $P_7$ of the hierarchical layer in the second sub period.

According to an embodiment of the present inventive concept, the 1st second search range obtained in the first sub period may be applied to perform the inter-prediction operations on the pictures (e.g., the pictures $P_5$, $P_6$, and $P_7$) of the hierarchical layer in the second sub period. The hierarchical layer pictures of the first sub period may precede the hierarchical layer pictures in the encoding sequence.

FIG. 7B is a diagram illustrating a hierarchical picture structure of a GOP according to an embodiment of the present inventive concept.

Referring to FIG. 7B, a GOP includes a base layer TL0, a first layer TL1, and a second layer TL2. The first and second layers TL1 and TL2 are hierarchical layers.

A picture $P_0$ having the I picture type and pictures $P_4$ and $P_8$ having the P picture type are included in the base layer TL0, and pictures $P_2$ and $P_6$ having the P picture type are included in the first layer TL1 of the hierarchical layer, and pictures $P_1$, $P_3$, $P_5$, and $P_7$ having the P picture type are included in the second layer TL2 of the hierarchical layer.

Numerals in parentheses indicate the encoding sequence.

A 1st second search range obtained in a first sub period, for example, a second search range obtained when encoding the picture $P_4$ with reference to the picture $P_0$, may be applied to perform an inter-prediction operation on the pictures $P_1$, $P_2$ and $P_3$ of the hierarchical layer in the first sub period, and a 2nd second search range obtained in a second sub period, for example, a second search range obtained when encoding the picture $P_8$ with reference to the picture $P_4$, may be applied to perform an inter-prediction operation with respect to the pictures $P_5$, $P_6$ and $P_7$ of the hierarchical layer in the second sub period.

According to an embodiment of the present inventive concept, the 1st second search range obtained in the first sub period may be applied to perform the inter-prediction operations on the pictures (e.g., the pictures $P_5$, $P_6$, and $P_7$) of the hierarchical layer in the second sub period. The hierarchical layer pictures of the first sub period may precede the hierarchical layer pictures in the encoding sequence.

Figure 7C:
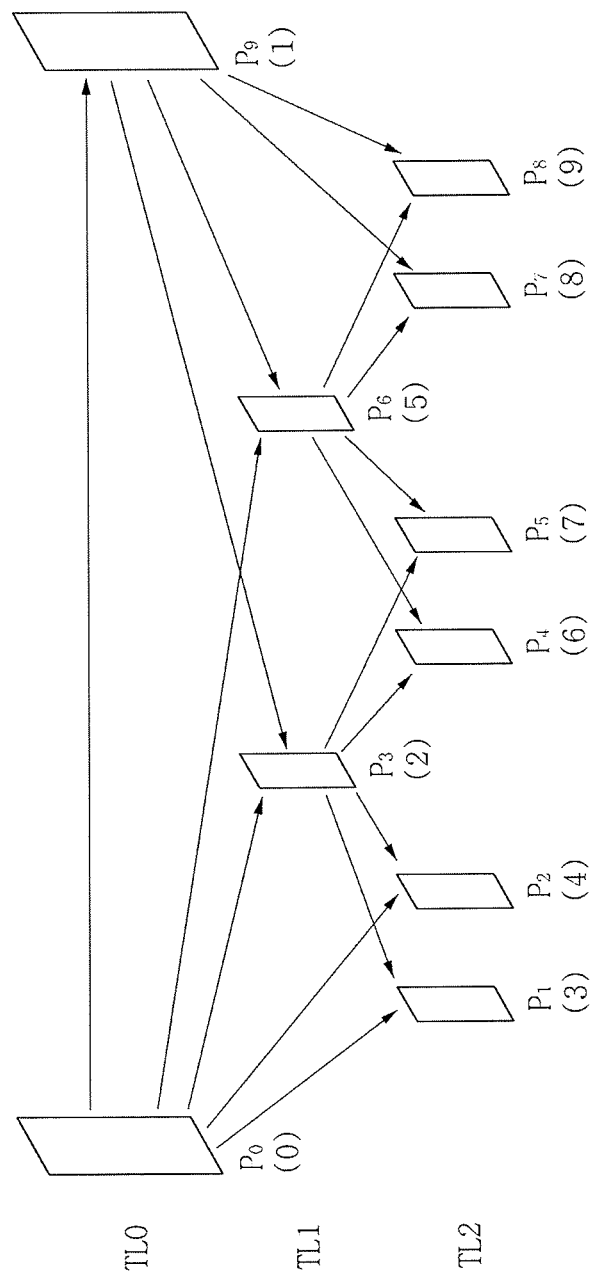
FIG. 7C is a diagram illustrating a hierarchical picture structure of a GOP according to an embodiment of the present inventive concept.

FIG. 7C is a diagram illustrating a hierarchical picture structure of a GOP according to an embodiment of the present inventive concept.

Referring to FIG. 7C, a GOP includes a base layer TL0, a first layer TL1, and a second layer TL2. The first and second layers TL1 and TL2 are hierarchical layers.

A picture $P_0$ having the I picture type and a picture $P_9$ having the P picture type are included in the base layer TL0, pictures $P_3$ and $P_6$ having the B picture type are included in the first layer TL1 of the hierarchical layer, and pictures $P_1$, $P_2$, $P_4$, $P_5$, $P_7$, and $P_8$ having the B picture type are included in the second layer TL2 of the hierarchical layer.

Numerals in parentheses indicate the encoding sequence.

A second search range, for example, a second search range obtained when encoding the picture $P_9$ with reference to the picture $P_0$, may be applied to perform an inter-prediction operation on the pictures $P_1, P_2, P_3, P_4, P_5, P_6, P_7$, and $P_8$ of the hierarchical layer.

FIG. 7D is a diagram illustrating a hierarchical picture structure of a GOP according to an embodiment of the present inventive concept.

Referring to FIG. 7D, a GOP includes a base layer TL0, a first layer TL1, and a second layer TL2. The first and second layers TL1 and TL2 are hierarchical layers.

A picture $P_0$ having the I picture type and a picture $P_9$ having the P picture type are included in the base layer TL0, pictures $P_3$ and $P_6$ having the P picture type are included in the first layer TL1 of the hierarchical layer, and pictures $P_1$, $P_2$, $P_4$, $P_5$, $P_7$, and $P_8$ having the P picture type are included in the second layer TL2 of the hierarchical layer.

Numerals in parentheses indicate the encoding sequence.

A second search range, for example, a second search range obtained when encoding the picture $P_9$ with reference to the picture $P_0$, may be applied to perform an inter-prediction operation on the pictures $P_1, P_2, P_3, P_4, P_5, P_6, P_7$, and $P_8$ of the hierarchical layer.

Figure 8:
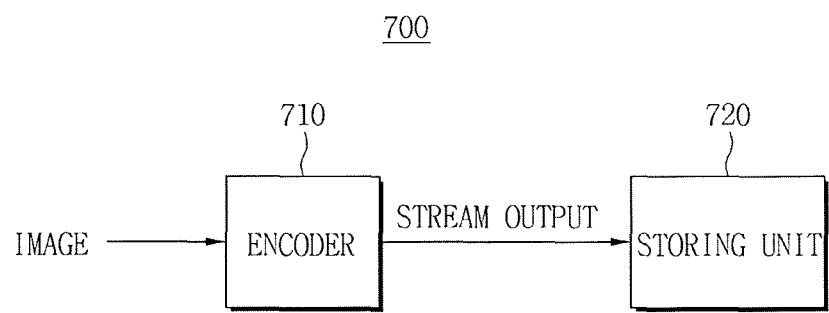
FIG. 8 is a diagram illustrating a configuration of a video encoding device according to an embodiment of the present inventive concept.

FIG. 8 is a diagram illustrating a configuration of a video encoding device according to an embodiment of the present inventive concept.

Referring to FIG. 8, a video encoding device 700 may include an encoder 710 and a storing unit 720.

The encoder 710 may be the video encoding device shown in FIG. 1.

The encoder 710 may output an encoded bit stream to the storing unit 720 after encoding a received picture sequence.

The storing unit 720 may store the encoded bit stream received from the encoder 710. The storing unit 720 may include a memory controller for controlling a memory device, and the memory device may include memory cells for storing data.

Figure 9:
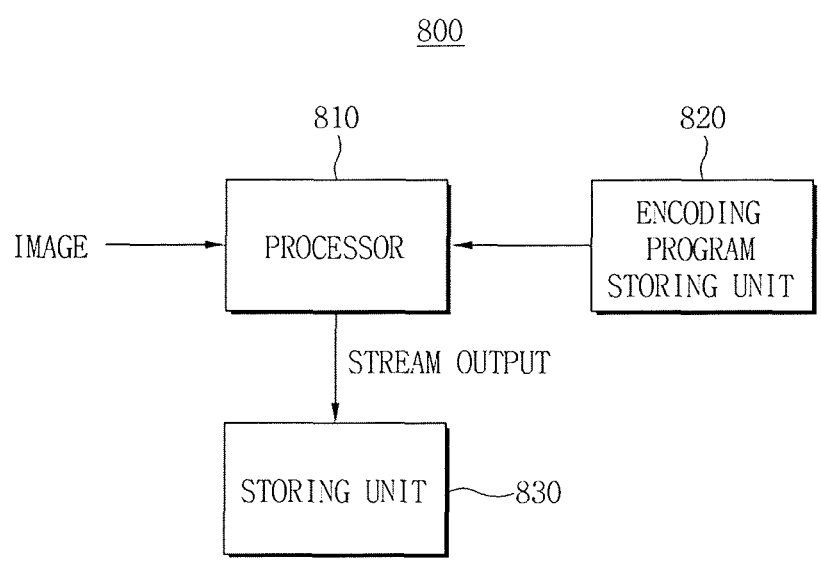
FIG. 9 is a diagram illustrating a configuration of a video encoding device according to an embodiment of the present inventive concept.

FIG. 9 is a diagram illustrating a configuration of a video encoding device according to an embodiment of the present inventive concept.

Referring to FIG. 9, a video encoding device 800 may include a processor 810, an encoding program storing unit 820, and a storing unit 830.

The processor 810 may encode a received picture sequence by downloading and executing an encoding program stored in the encoding program storing unit 820.

The method of encoding the picture sequence using the encoding program will be described with reference to FIGS. 3 to 6.

The processor 810 may output the encoded bit stream to the storing unit 830.

The encoding program storing unit 820 may store the encoding program programmed to perform the steps described in FIGS. 3 to 6.

The storing unit 830 may store the encoded bit stream received from the processor 810. The storing unit 830 may include a memory controller for controlling a memory device, and the memory device may include memory cells for storing data.

Figure 10:
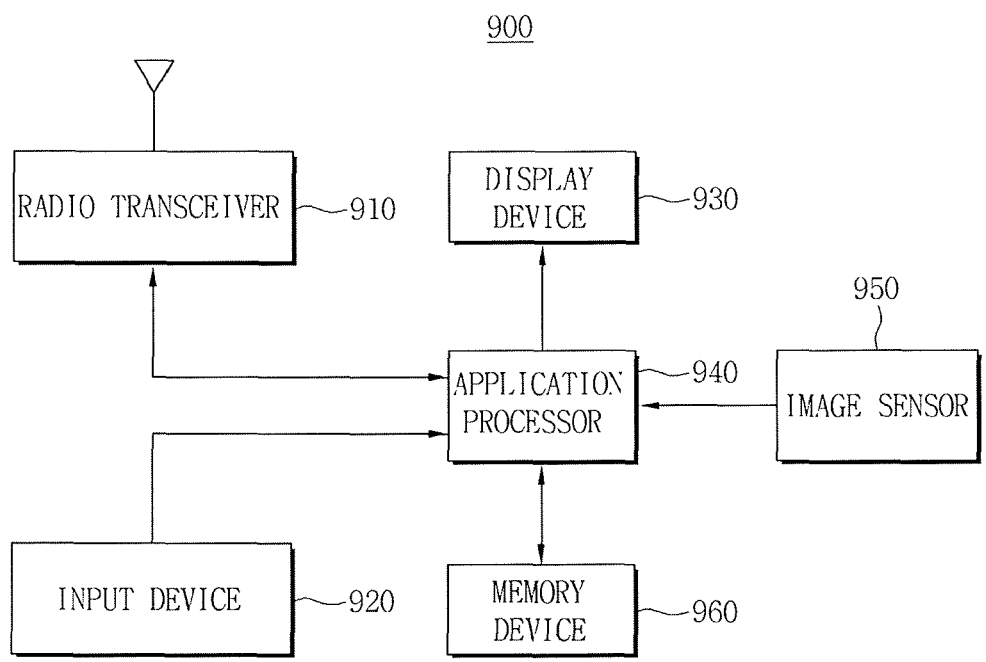
FIG. 10 is a diagram illustrating a configuration of a computer system including a video encoding device according to an embodiment of the present inventive concept.
Figure 11:
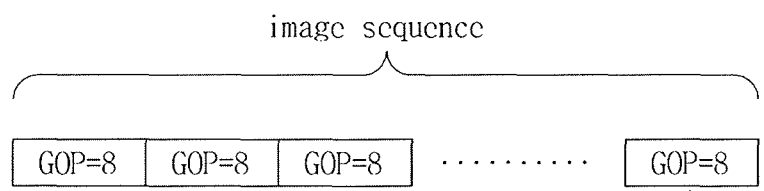
FIG. 11 is a diagram illustrating an example in which a size of a GOP configuring a image sequence is 8.

FIG. 10 is a diagram illustrating a configuration of a computer system including a video encoding device according to an embodiment of the present inventive concept.

Referring to FIG. 10, a computer system 900 may include a radio transceiver 910, an input device 920, a display device 930, an application processor 940, an image sensor 950, and a memory device 960.

The radio transceiver 910 may receive and transmit a radio signal through an antenna. For example, the radio transceiver 910 may convert the radio signal received through the antenna into a signal capable of being processed in the application processor 940, and output the converted signal to the application processor 940.

In addition, the radio transceiver 910 may receive a signal processed in the application processor 940, convert the received signal into a radio signal which is suitable for radio communications, and transmit the converted radio signal to the outside through the antenna.

The input device 920 is a device capable of inputting a control signal for controlling an operation of the application processor 940, or data being processed by the application processor 940. The input device 920 may include a pointing device such as a touch pad, a computer mouse, a keypad, a keyboard, or the like.

The display device 930 may receive an image signal processed by the application processor 940, and display an image according to the received image signal.

The application processor 940 may download various application programs stored in the memory device 960, and execute a specific application. According to an embodiment of the present inventive concept, the application processor 940 may encode an image sensed in the image sensor 950 according to an encoding program. The encoded image may be transmitted to the memory device 960 or the radio transceiver 910.

The image sensor 950 may convert an optical image into digital signals, and transmit the converted digital signals to the application processor 940.

The memory device 960 may store data processed in the application processor 940, and store various application programs. According to an embodiment of the present inventive concept, the memory device 960 may store video data encoded by the application processor 940, and store the encoding program.

The application processor 940 and the memory device 960 may be included in the video encoding device 800 shown in FIG. 8.

The present inventive concept may be applied to MPEG 4, H.264, HEVC, or VP8/9.

The present inventive concept may be applied to a system on chip (SOC) including the video encoding device.

According to an embodiment of the present inventive concept, when encoding videos, an encoding time and power consumption can be reduced by minimizing an unnecessary search operation for the ME.

The foregoing is illustrative of embodiments of the present inventive concept and the present inventive concept should not be construed as being limited by the embodiments described herein. Although a few embodiments have been described, it will be understood that various modifications in form and detail may be possible therein without departing from the spirit and scope of the present inventive concept.

What is claimed is:

1. A device for encoding a picture sequence including a group of pictures (GOP) having a base layer and a hierarchical layer, the device comprising:
   a first unit configured to receive first unit blocks generated by dividing a first picture in the base layer, to perform an inter-prediction operation on the first unit blocks with reference to a first reference picture in the base layer using a first search range and to obtain first optimum motion vectors corresponding to the first unit blocks; and
   a second unit configured to determine a second search range using the first optimum motion vectors, wherein the first unit is configured to receive second unit blocks generated by dividing a second picture in the hierarchical layer and to perform an inter-prediction operation on the second unit blocks using the second search range;

wherein the second unit is configured to determine an accumulated motion vector corresponding to the first picture using the first optimum motion vectors and to determine the second search range using the determined accumulated motion vector;

a third unit configured to perform an intra-prediction operation on the first unit blocks of the first picture; and a fourth unit configured to determine one encoding mode between inter- and intra-encoding modes for each of the first unit blocks using the inter-prediction operation and the intra-prediction operation, and to generate an encoding mode counting signal based on numbers of the determined inter- and intra-encoding modes for each of the first unit blocks, wherein the second unit is configured to determine the second search range using the encoding mode counting signal.

2. The device according to claim 1, wherein the second unit is configured to determine an initial set search range as the accumulated motion vector when an intra-encoding mode rate obtained using the encoding mode counting signal is greater than a first threshold value, and wherein the intra-encoding mode rate is a ratio of the number of the determined intra-encoding modes to the number of the determined inter-encoding modes.

3. The device according to claim 1, wherein the second picture is a picture between the first reference picture and the first picture referring to the first reference picture.

4. A method for encoding a picture sequence including a group of pictures (GOP) having a base layer and a hierarchical layer the method comprising:

obtaining an accumulated motion vector when encoding first unit blocks of a first picture in the base layer with reference to a first reference picture in the base layer using a first search range; and encoding a second picture in the hierarchical layer using a second search range determined using the obtained accumulated motion vector;

wherein the obtaining of the accumulated motion vector comprises:

performing an intra-prediction operation and an inter-prediction operation on the first unit blocks using the first search range;

obtaining first optimum motion vectors using the inter-prediction operation performed on the first unit blocks;

obtaining a plurality of accumulated motion vector regions using the first optimum motion vectors;

performing an encoding operation on the first unit blocks according to results of the intra-prediction operation and the inter-prediction operation; and determining the accumulated motion vector using the obtained plurality of accumulated motion vector regions;

wherein the obtaining of the plurality of accumulated motion vector regions, the plurality of accumulated motion vector regions including first to third accumulated motion vector regions, further comprises:

increasing a value of the first accumulated motion vector region by 1 when absolute values of x and y components of each of the first optimum motion vectors are included in a first motion vector region of a plurality of motion vectors regions, wherein the plurality of motion vector regions is obtained by dividing the first search range;

increasing a value of the second accumulated motion vector region by 1 when the absolute values of x or y components of each of the first optimum motion vectors is included in a second motion vector region of the plurality of motion vectors regions; and increasing a value of the third accumulated motion vector region by 1 when the absolute values of x or y components of each of the first optimum motion vectors are included in a third motion vector region of the plurality of motion vectors regions;

wherein the performing of the encoding operation on the first unit blocks comprises:

determining one encoding mode between inter- and intra-encoding modes using the inter- and intra-prediction operations for each of the first unit blocks; and accumulating a number of the inter-encoding modes or a number of the intra-encoding modes depending on the determined encoding mode.

5. The method according to claim 4, wherein the determining of the accumulated motion vector comprises determining an initial set search range as the accumulated motion vector when an intra-encoding mode rate of the first picture is greater than a first threshold value, and wherein the intra-encoding mode rate is a ratio of the number of the determined intra-encoding modes to the number of the determined inter-encoding modes.

6. The method according to claim 5, wherein the determining of the accumulated motion vector comprises:

determining ±maximum value of the first motion vector region as the accumulated motion vector when a value of the first accumulated motion vector region is equal to or greater than a second threshold value;

determining ±maximum value of the second motion vector region as the accumulated motion vector when the value of the first accumulated motion vector region is smaller than the first threshold value, and a value of the second accumulated motion vector region is equal to or greater than the second threshold value; and determining ±maximum value of the third motion vector region as the accumulated motion vector when the values of the first and second accumulated motion vector regions are smaller than the second threshold value, and a value of the third accumulated motion vector region is equal to or greater than the second threshold value.

7. The method according to claim 4, wherein the determined accumulated motion vector is determined as the second search range when the determined accumulated motion vector is greater than a minimum search range, and wherein the minimum search range is determined as the second search range when the determined accumulated motion vector is equal to or smaller than the minimum search range.

8. A device for encoding a picture sequence including a group of pictures (GOP) having a base layer and a hierarchical layer, the device comprising:

an inter-prediction unit configured to receive first unit blocks generated by dividing a first picture in the base layer, to perform an inter-prediction operation on the first unit blocks with reference to a first reference picture in the base layer using a first search range, and to obtain first optimum motion vectors corresponding to the first unit blocks;

an intra-prediction unit configured to perform an intra-prediction operation on the first unit blocks; and a search range determining unit configured to receive the first optimum motion vectors from the inter-prediction unit, to obtain an accumulated motion vector using the first optimum motion vectors, to determine the second search range using the obtained accumulated motion vector, and to output the determined second search range to the inter-prediction unit, wherein the second search range is used to perform an inter-prediction operation on second unit blocks generated by dividing a second picture in the hierarchical layer; and a mode determination unit configured to determine one encoding mode between inter- and intra-encoding modes for each of the first unit blocks using the inter-prediction operation and the intra-prediction operation, and to generate an encoding mode counting signal based on numbers of the determined inter- and intra-encoding modes for each of the first unit blocks, wherein determination of the second search range includes using the encoding mode counting signal.

9. The device according to claim 8, further comprises a unit block generating unit configured to generate the first unit blocks and the second unit blocks.

10. The device according to claim 8, further comprises a unit block encoding unit configured to encode each of the first unit blocks according to an encoding mode determined using the inter- and intra-prediction operations.

11. The device according to claim 8, wherein the second picture is a picture between the first reference picture and the first picture referring to the first reference picture.

12. The device according to claim 8, wherein the obtained accumulated motion vector is determined as the second search range when the obtained accumulated motion vector is greater than a minimum search range, and wherein the minimum search range is determined as the second search range when the obtained accumulated motion vector is equal to or smaller than the minimum search range.

* * * * *